US005790169A

United States Patent [19]
Hohenacker

[11] Patent Number: 5,790,169
[45] Date of Patent: Aug. 4, 1998

[54] DEVICE FOR STORING PICTURE OR CODE INFORMATION DISPLAYED ON A SCREEN, CARRIER CARDS FOR SUCH DEVICES AND METHOD FOR THE TRANSMISSION OF A CODE

[76] Inventor: Thomas Hohenacker, Wilhelmstrasse 4, Muenchen, Germany, 80801

[21] Appl. No.: 553,003

[22] Filed: Nov. 3, 1995

Related U.S. Application Data

[63] Continuation-in-part of Ser. No. 532,737, Oct. 13, 1995.

[30] Foreign Application Priority Data

Nov. 3, 1994 [DE] Germany .......................... 44 39 264.8

[51] Int. Cl.[6] .............................. H04N 5/00; H04N 5/44; H04N 5/46; H04N 5/10

[52] U.S. Cl. .............................. 348/2; 348/1; 348/553; 348/557

[58] Field of Search .............................. 348/1, 2, 553, 348/3, 4; H04N 5/00, 5/44, 5/46, 5/10

[56] References Cited

U.S. PATENT DOCUMENTS

| | | | |
|---|---|---|---|
| 4,613,904 | 9/1986 | Lurie . | |
| 4,697,209 | 9/1987 | Kiewit et al. | 348/1 |
| 5,287,181 | 2/1994 | Holman | 348/1 |
| 5,453,015 | 9/1995 | Vogel | 348/2 |
| 5,465,384 | 11/1995 | Bejan et al. | 348/2 |

FOREIGN PATENT DOCUMENTS

| | | |
|---|---|---|
| 0127068 | 12/1984 | European Pat. Off. . |
| 1 949 397 | 4/1971 | Germany . |
| 4312185 A1 | 10/1994 | Germany . |

*Primary Examiner*—Tommy P. Chin
*Assistant Examiner*—Nhon T. Diep
*Attorney, Agent, or Firm*—Townsend and Townsend and Crew LLP

[57] ABSTRACT

A device for storing picture information, in particular a code displayed on a part of the area of a monitor comprising a storage medium of photosensitive material which can be secured on the monitor surface by means of an adhesion layer effective at the monitor side, wherein the photosensitive material is applied onto an areal carrier medium and is there active at the monitor side only in specific regions spaced apart from one another. Furthermore, the invention relates to a method for the technical transmission of a code.

38 Claims, 3 Drawing Sheets

DEVICE FOR STORING PICTURE OR CODE INFORMATION DISPLAYED ON A SCREEN, CARRIER CARDS FOR SUCH DEVICES AND METHOD FOR THE TRANSMISSION OF A CODE

This application is a continuation-in-part application of co-pending application Ser. No. 08/532,737, filed Oct. 13, 1995.

BACKGROUND OF THE INVENTION

The invention relates to a device for storing picture information, in particular an code displayed on a part of the area of a monitor, comprising a storage medium of photosensitive material which can be secured on the monitor surface by means of a adhesion layer effective at the monitor side.

A device of this kind is known from the German patent application P 43 12 185.3. The invention described in this patent application was based on the object of providing a device with which any kind of television program can be made more interesting with the viewer being animated to participate and by which the television company can obtain information concerning the number of viewers.

Examples for the use of a device of the described kind are explained in the named German patent application.

The problem with this device is that the information portrayed on the television screen is imaged in a non-sharp manner on the surface of the screen due to the thickness of the glass tube, so that the information portrayed cannot be stored in certain cases in an absolutely sharp manner on the photosensitive material.

SUMMARY OF THE INVENTION

An object of the present invention is to provide an apparatus for the storage of picture information shown on a part area of a monitor in such a way that the information portrayed on the screen can be stored on the photosensitive material with superior sharpness.

In accordance with the invention this object is satisfied in that the photosensitive material is applied onto an areal carrier medium and is there active at the monitor side only in specific regions spaced from one another. This can in particular be achieved in that

- a mask or diaphragm layer, in particular an aperture diaphragm layer which brings about a focusing effect, is provided at the side of the carrier medium adjacent the monitor and is made light permeable in the active regions and light impermeable in the regions lying between the active regions and/or
- in that the photosensitive material is only applied to the active regions of the carrier medium.

Through the provision of the active and inactive regions in accordance with the invention it is ensured that light radiated from the monitor only triggers a storage procedure in the active regions, with the corresponding regions of the photosensitive material being mutually delimited by the inactive regions.

The feature of the invention, in accordance with which the photosensitive material is applied onto an areal carrier medium and is there active at the monitor side, includes all possible arrangements of the carrier medium and of the photosensitive material in which light coming from the monitor can trigger a storage process in the photosensitive material. That is, the photosensitive material can be arranged both on the monitor side of the carrier medium and also—for example when using a transparent carrier medium—on the side of the carrier medium remote from the monitor.

Since the individual active regions are partitioned from one another in each case by inactive regions, and are thus spaced apart, it is ensured that each region of the light sensitive material intended for the storage of information actually only receives light intended for this region, with the reception of light information intended for neighboring regions being precluded by the provision of the inactive regions. In this manner it is possible to form a substantially sharp image on all active regions of the photosensitive material which are in particular associated with respective light-permeable regions of the mask or diaphragm layer.

When transmitting a program a symbol is shown on the screen the geometry of which is so selected that only quite specific regions of the photosensitive material are exposed. On providing a specific number of active regions (for example six to twelve), specific codes, in particular codes having two or three different brightness steps, can be shown on the screen and can be stored in the photosensitive material, with a code respectively corresponding to a specific arrangement of bright and dark regions within the transmitted symbol. Through the intentional arrangement of the bright regions on the screen only corresponding oppositely disposed active regions of the photosensitive material are exposed.

Through this method it is possible, for example during the evaluation of the storage device, to determine which type of program a viewer has seen, provided a specific symbol of the named kind is associated with this program. In the described manner a code which characterizes a program can as a consequence be stored in the photosensitive material, and it is subsequently possible to check whether the storage device of the invention was secured to the screen during the transmission of the program.

In a possible embodiment of the device of the invention a non-photosensitive carrier material, for example a foil, is used on which the photosensitive material is applied only in those regions which are ultimately intended to be suitable for the storage of picture information. These regions then represent the active regions of the device which are delimited from one another by inactive regions and to which accordingly no photosensitive material was applied.

In this case it is of advantage that comparatively little photosensitive material is required since this is only applied to the active regions of the carrier medium. In this way the manufacturing costs can be reduced.

When using the above-mentioned mask or diaphragm layer the light-permeable regions of the mask or diaphragm layer mark those active regions on the photosensitive material on which picture information can be stored. The light can thereby only reach the photosensitive material through the light-permeable regions and the remaining regions of the photosensitive material which are covered by the light-impermeable regions cannot be exposed.

It can also be of advantage when using the mask or diaphragm layer to apply the photosensitive material only in those regions which are ultimately intended for the storage of picture information, since in this way a reduction of the manufacturing costs can also be achieved.

The mask or diaphragm layer can consist of an at least substantially light impermeable material, for example of paper, card, cardboard or plastic, or can also be applied by means of a coating process onto the carrier medium.

The sharpness of the stored picture can thereby be enhanced in that the mask or diaphragm layer is formed so that a focusing effect is achieved by it.

For this purpose, when using the described mask or diaphragm layer having a certain thickness, the light-permeable regions can each be formed for example by a cut-out, preferably by a hole or by a slot diaphragm. In particular it is possible to use a plurality of such aperture or slot diaphragms, with preferably between 3 and 500 substantially circular cut-outs forming individual aperture diaphragms being provided.

In a preferred embodiment the cut-outs, or the active regions, are arranged substantially regularly distributed around the center point of the mask or diaphragm layer.

The thickness of the diaphragm layer is to be selected in dependence on the sensitivity of the photosensitive material, on the size of the cut-outs provided in the diaphragm layer, and/or on the sharpness of a picture which is to be stored and is illustrated on the surface of a screen. In this connection the diaphragm layer can be made thinner the more sensitive the photomaterial is or the smaller the cut-outs provided in the diaphragm layer are.

In principle a problem to be solved in the context of the invention lies in the fact that the glass tube of a screen has a certain thickness which leads to pictures generated on the inner side of the glass tube being imaged in a non-sharp manner on the outer surface of the glass tube. In order to compensate for this lack of sharpness the diaphragm layer is for example provided, which brings about a focusing of the image onto the photosensitive material. In this arrangement the focusing effect must be stronger the thicker the tube of the screen is, which is why the thickness of the diaphragm layer can be made less as tubes become thinner.

With a customary application the thickness of the diaphragm layer amounts to approximately 5 mm.

In order to be able to carry out the manufacture of the storage device of the invention as quickly and as economically as possible it is recommended that the storage device be built up in a substantially flat manner from different layers. Thus, for example in a simple embodiment, only an mask or diaphragm layer and a adhesion layer can be applied onto a photosensitive film. Through this flat construction the storage device can also be packed in a space-saving manner, and can thus be transported and sold in a cost-effective manner.

the storage medium can be formed as a circular disk. However any other desired contours, for example substantially circular or also polygonal, in particular rectangular, hexagonal or octagonal contours, can be used. For example it is also possible to give the storage device the shape of a television logo or other promotionally active shape, in particular a shape symbolic of a specific business.

It is of advantage from a technical manufacturing viewpoint when the outer contour of the mask or diaphragm layer corresponds substantially to the outer contour of the carrier medium.

For the photosensitive material, use is in particular made of substances which change visible without the addition of a developer during the action of light, so that the developing process which would customarily take place separately after exposure can be spared.

Photochromic substances are preferably used. These are characterized in that they adopt a particular color on irradiation with ultraviolet light and become transparent when irradiated with visible light.

Before the storage procedure the photochromic material is irradiated with ultraviolet light in order to enable a subsequent storage of pictures or symbols which reflect or transmit visible light. Between the radiation with ultraviolet light and the storage procedure it must be ensured that the photosensitive material is not irradiated with visible light, even for a negligible time. For this purpose the storage material can be provided at the side remote from the adhesion layer with a light-impermeable layer and can be secured with the adhesion layer onto a light-permeable carrier card, such as, for example, a postcard.

The exposure time within which a storage of a picture takes place on a photochromic layer preferably amounts to approximately 30 minutes. The exposure time is, however, variable depending on the photochromic material used and on the brightness of the transmitted picture.

When the photosensitive layer consists of several photochromic substances which respectively respond to visible light of different wavelength, then colored pictures can also be stored in the storage device of the invention.

An advantage of the use of photochromic materials lies in the fact that the photosensitive material can be made reusable in a simple manner by irradiation with UV light after exposure has taken place.

In a preferred embodiment the carrier medium into which the photosensitive layer is introduced is provided at the side remote from the monitor side with a reflective layer, in particular a bright, white and/or metallic reflective layer, which reflects rays which penetrate through the photosensitive layer, or more particularly, the transparent carrier medium, back onto the latter. This measure leads to a more intensive exposure of the photosensitive material and thus to shorter exposure times.

An aluminum or silver layer is preferably vapor deposited onto the side of the carrier medium or of the photosensitive material remote from the monitor side.

The adhesion layer which is arranged on the side of the mask or diaphragm layer remote from the carrier medium is preferably formed as a self-adhesive layer which can be covered by a removable protective film prior to use of the device. In this form the storage device can be sold without difficulties and, moreover, the viewer can handle the device without difficulty.

The adhesion layer need not, however, be formed as a self-adhesive layer. It can, for example, also be conceived that the storage device merely sticks to the screen by means of electrostatic forces.

It is of advantage when a layer which absorbs visible light, in particular a black layer, is provided at the side facing the monitor to avoid disturbing reflections and faulty exposures associated therewith. For this purpose, the adhesion layer can, for example, also be manufactured of a material which absorbs visible light.

The storage device can, for example, be provided with an impermeable layer at the side remote from the screen. Any desired text or a desired symbol can be printed onto this layer in a manner visible to the viewer and can thus be seen by the viewer during the entire time in which the storage device is applied to the screen. Thus the side of the storage device remote from the monitor can be used as an advertising surface.

The photosensitive material can be designed for the storage of code elements of different brightness steps or stages, in particular of two or three different brightness stages.

Furthermore it is possible to make the storage medium frequency selective so that it only reacts to defined light wavelengths, for example to light wavelengths of a specific color. This enables the storage of colored pictures.

Through the possibility of storing several brightness stages or a plurality of colors the number of different codes which can be stored can be significantly increased.

In order to facilitate the positioning of the storage medium on the monitor, at least one and in particular three or four reference marks distributed over the periphery of the carrier medium or of the mask or diaphragm layer can be provided, which must be aligned with one or more marks shown on the monitor during an attachment of the storage medium to the monitor.

The reference marking can, for example, be formed by the outer contour line of the carrier medium, and/or of the mask or diaphragm layer, and defines a non-point-symmetrical line so that the storage medium can be attached to the screen with an unambiguous orientation.

An additional simplification of the attachment procedure can be achieved when a central cut-out, in particular a circular cut-out, is provided at the center point of the mask or diaphragm layer.

Since the size of the symbol to be recorded with the storage medium depends on the size of the respective monitor, the size of the storage medium must be matchable, at least within certain limits, to the size of the monitor.

For this purpose the laminate consisting of the mask or diaphragm layer and the photosensitive material or carrier medium can be formed from an inner substantially circular region and at least one ring region which concentrically surrounds the circular region, with the circular region and the ring region being made separable from one another. In this way a cut-out or an active region in the ring region is associated with each cut-out or each active region in the circular region. Preferably the respectively associated cut-outs or active regions are respectively arranged substantially on a straight line which extends away from the center point of the mask or diaphragm layer.

When using a storage medium formed in this way on a smaller screen the circular region is separated out from the ring region and is attached to the screen on its own without the ring region. When using a storage medium on a larger screen either the entire storage medium consisting of the circular region and the ring region or only the ring region separated from the circular region is used.

When a storage medium is to be used for screens of very different sizes, correspondingly more ring regions concentric to one another can be provided.

When splitting up the storage medium into a circular region and at least one ring region it is of advantage when both the circular region and also the ring region are provided with the already mentioned reference markings, so that the circular region alone can also be positioned on the monitor without problem.

At least one lens, in particular a plastic lens, which is preferably formed as the Fresnel lens, can be arranged between the screen and the storage medium or between the adhesion layer and the carrier medium. A lens of this kind can be integrated without difficulties into the layer-like build-up of the storage device of the invention.

The lens can for example serve to additionally focus the symbol imaged in a non-sharp manner on the screen, so that it is imaged in a particularly sharp manner on the storage medium. An arrangement consisting of a plurality of lenses can, if necessary, also be used.

The storage device of the invention can also be made so that the developer which makes the stored picture information visible is integrated into the storage device, or so that the stored picture information can be subsequently developed by a developer layer or developer liquid which can be brought into connection with the storage device.

It is particularly advantageous when the storage device of the invention is mounted at the time of acquisition by the viewer on a carrier card of paper, card, cardboard or laminated card or cardboard, which in particular has the format of a postcard. In this manner the storage device can be sold in a particularly convenient manner and at the same time the viewer has a postcard-like carrier card available after exposure of the storage device onto which he can reattach the exposed storage device and by means of which he can send it back again to the television company. It is thereby advantageous when the carrier card including the storage medium has a weight smaller than or equal to 50 g, since in this case only low postal charges arise.

Furthermore, it is advantageous when the storage device is releasably secured onto the postcard-like carrier card by means of its adhesion layer. In this case the provision of a protective film covering over the adhesion layer can be omitted. The adhesion layer can also be reused again after exposure of the storage device to secure the storage medium onto the postcard-like carrier card.

It is straightforward to arrange more than one storage device on the carrier card.

Handling depressions are preferably provided at the carrier card to simplify the removal of the storage media.

In the context of the invention a method for the technical transmission of a code was developed which can be shown on a part of the area of a television screen, which consists of several code elements of different brightness stages or colors and which can be stored in an optical storage medium of the described kind attached to the television screen.

In order to provide the possibility of storing codes shown on television screens of different sizes on storage media of unitary sizes the code has, in accordance with the invention, an at least substantially point-symmetrical shape.

Preferably the code has a circular shape, with the code being transmitted in code elements which have substantially the shape of a sector of a circle and adjoin one another.

It is furthermore of advantage when specific code elements of a code can be transmitted timewise one after another within a television program since the television viewer then never sees the complete code on the screen, which leads to an increased security against forgery.

Furthermore, it is of advantage when the code is not necessarily transmitted with a specific television program but is rather, for example, selectively blended in by means of teletext, so that only those television viewers cause a code to be displayed which use the storage device of the invention.

Further preferred embodiments of the method for transmitting the code of the invention are described in conjunction with FIG. 4.

Moreover, further advantageous embodiments of the invention are set forth in the subordinate claims.

DESCRIPTION OF THE PREFERRED EMBODIMENTS

Figure 1:
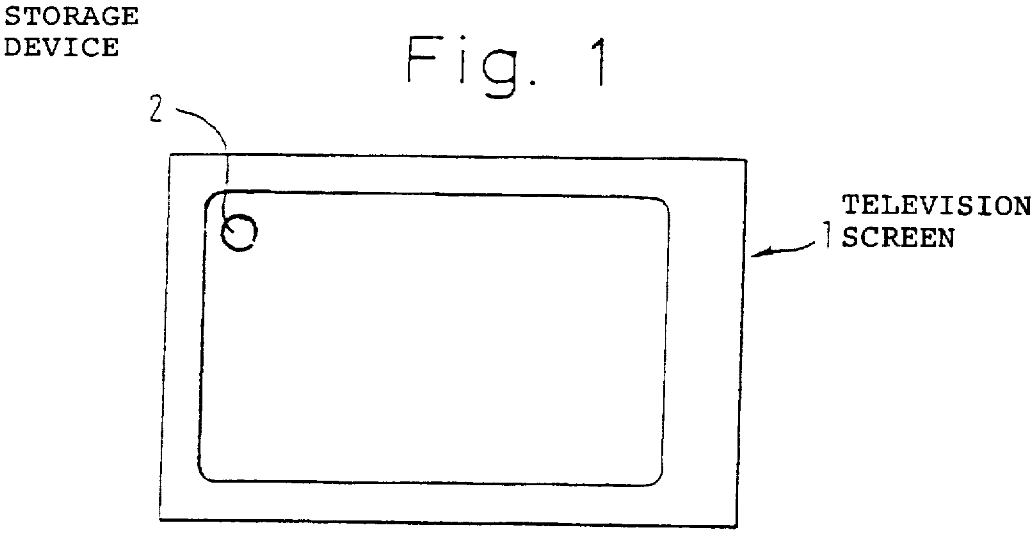
FIG. 1 is a screen with a storage device in accordance with the invention.

FIG. 1 shows in highly schematic form the front view of a monitor or of a television screen 1. In the left-hand upper corner of the screen a disk-like storage device 2 in accordance with the invention is directly attached to the screen and covers over a part of the area of a television picture which can be shown on the screen.

Figure 2:
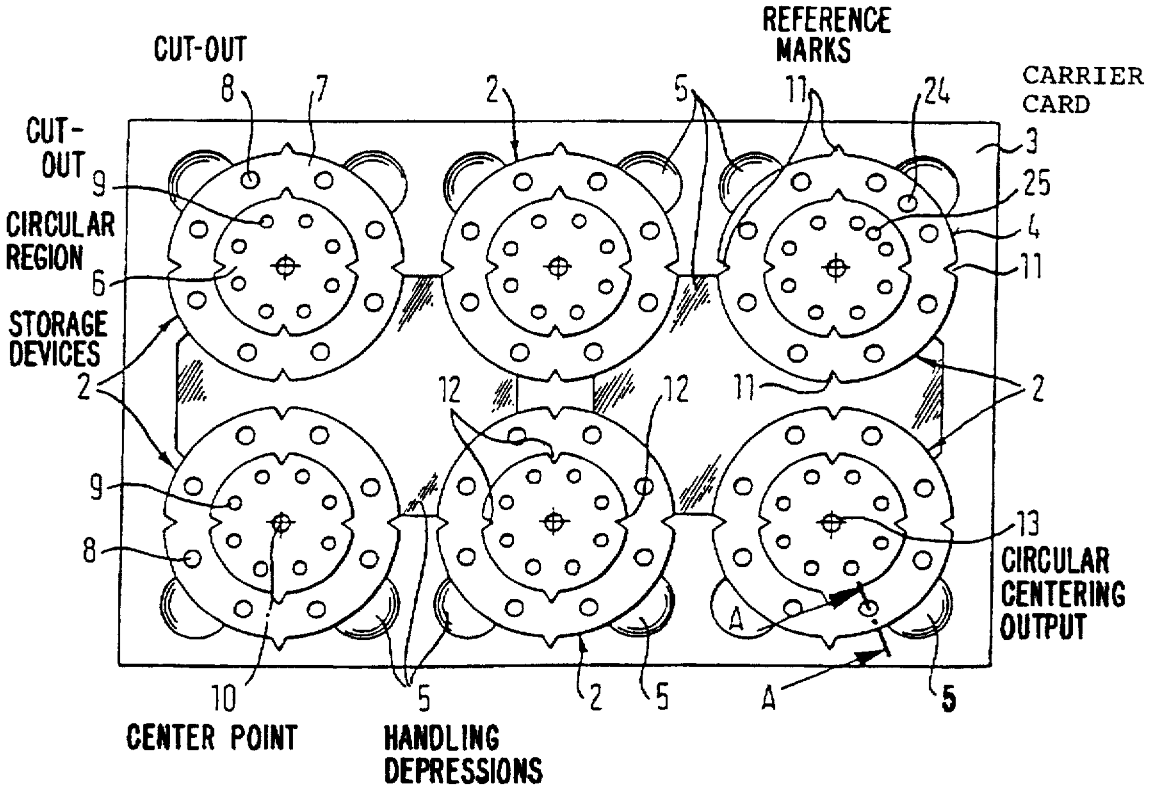
FIG. 2 is a schematic plan view of a carrier card with storage devices in accordance with the invention.

FIG. 2 shows a carrier card 3 for six storage devices 2 in accordance with the invention. In just the same way more or fewer storage devices can also be arranged on a carrier card.

The carrier card 3 can, for example, be manufactured of cardboard and have the format of a postcard. In this form the storage devices 2 of the invention can be sold in a particularly advantageous manner since the carrier card 3 can be used, on the one hand, as packaging for the sale of the storage devices 2 and, on the other hand, also for the return of the exposed storage devices 2.

The storage devices 2, which preferably have a thickness of about 5 mm in the same way as the carrier card 3, are inserted into cut-outs of the carrier card 3 which are matched to the shape of the storage devices 2. An undesired separation of the storage devices 2 from the carrier card 3 is, for example, prevented by the frictional engagement between the edge region 4 of the storage devices 2 and of the respective cut-out. The storage devices 2 can however also be secured by means of their adhesion layer to the carrier card 3.

In order to facilitate the removal of the storage devices 2 from the carrier card 3, grip or handling depressions 5 are provided in the carrier card.

The storage devices 2 consist of an inner substantially circular region 6 and a ring region 7 which concentrically surrounds the circular region 6, with the circular region 6 and the ring region 7 preferably only being connected together by frictional forces, so that they can be separated from one another as desired.

The ring region 7 has eight cut-outs 8 through which light can pass onto the photosensitive material contained in the storage devices 2. The eight cut-outs 8 are uniformly distributed around the periphery of the ring region 7.

One cut-out 9 in the circular region 6 is associated with each cut-out 8 of the ring region 7. In this arrangement, the respectively associated cut-outs 8, 9 are each substantially arranged on a straight line extending away from the center point 10 of the storage device 2.

Four reference marks 11 which are uniformly distributed over the periphery of the storage device 2 are provided at the ring region 7 and serve for the positioning on the screen 1. Three of these reference marks 11 are formed as triangular notches and one of these reference marks 11 is formed as an outwardly projecting likewise triangular formation.

The circular ring region 7 is provided with corresponding reference marks 12.

At the center point 10 of the storage device 2 a circular centering cut-out 13 is provided which can additionally serve for positioning.

In order to prevent the exposure process brought about by the monitor 1 from being easily simulatable with a light source, or to make this more difficult, at least one cut-out 24, 25 providing security against forgery can be positioned in the storage device 2 or in the mask or diaphragm layer in such a way that the active region formed by this cut-out 24, 25 providing security against forgery receives light from at least two of the code elements which can be shown on the monitor. If one of these two code elements is dark and the other is light then a medium brightness value lying between the exposure by a dark code element and the exposure by a light code element will be stored on the photosensitive region associated with the cut-out 24, 25 providing security against forgery.

The simulation of this medium value is significantly more difficult to bring about than the simulation of only one dark and one bright exposure step, whereby the security against forgery is increased as a consequence.

In one embodiment of the invention six cut-outs 24 providing security against forgery are provided in the ring region 7 and six cut-outs 25 providing security against forgery are provided in the circular region 6.

As already mentioned the storage devices 2 can be releasably arranged on specific regions of the carrier card 3 prior to their use. To effect the exposure the storage devices 2 are removed from the carrier card 3. After their exposure the storage devices 3 can be re-inserted into the carrier card 3 and sent together with the carrier card 3 as a postcard to the television manufacturer.

The address of the television manufacturer is preferably printed onto the non-illustrated reverse side of the carrier card 3.

The carrier card 3 can also be provided with through cut-outs onto which the storage devices can be inserted after exposure or over which the storage devices can be inserted after their exposure, with the side of the storage devices provided with the adhesion layer then being inserted through the cut-outs from the rear side of the carrier card. This facilitates the evaluation of the exposed storage devices since they can, for example, be investigated by an image processing system without having to be removed from the carrier card. In order to avoid, with a carrier card of this kind, a further exposure of the storage devices after they have been applied to the carrier card the latter is in this case provided at the rear side with a light-impermeable cover element, for example a removable foil or card material which can be folded back. A transparent foil can be preferably provided between the light-impermeable cover material and the stuck or storage devices, at least in the regions of the cut-outs.

Furthermore the carrier card can also be provided at its front side, onto which the storage devices are connected, with at least one further layer which for example protects the stuck-on storage devices against damage or covers them.

A large number of further embodiments of the carrier card are conceivable for which it is ensured that the exposed storage devices are not undesirably exposed to any further incident light after exposure has taken place with a simple reading of the picture information stored in the stuck-on storage devices nevertheless being possible.

Figure 3:
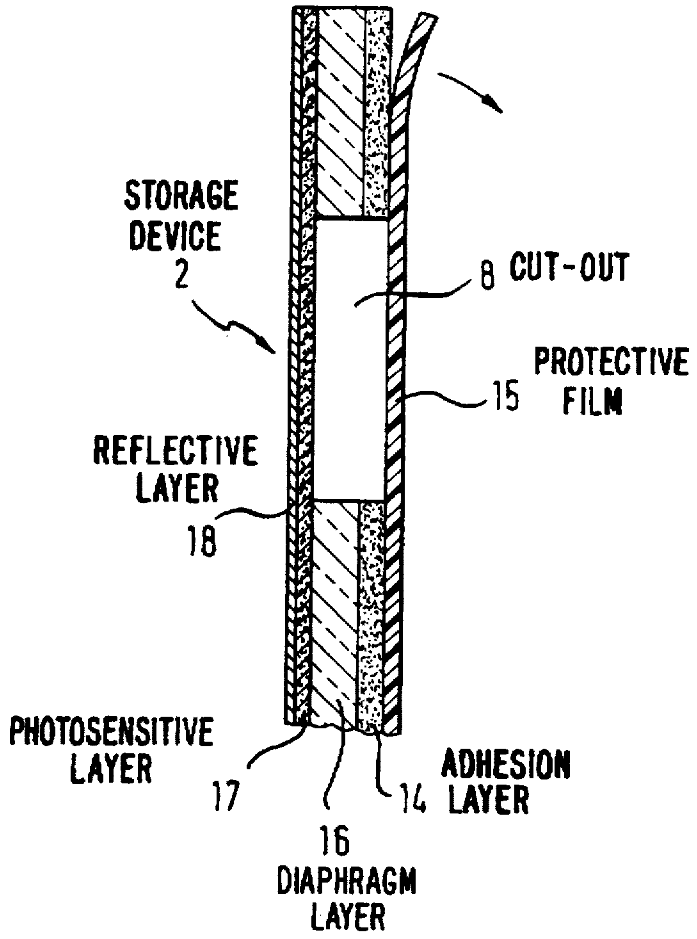
FIG. 3 is a greatly enlarged section A—A through a storage device in accordance with the invention illustrated in FIG. 2.

FIG. 3 shows a greatly enlarged section A—A through the ring region 7 of a storage device 2 in accordance with FIG. 2 before its application to the screen.

The storage device 2 is built up layerwise, with the transparent or light-permeable adhesion layer 14 active at the screen side being covered over prior to use of the storage device 2 by a protective film 15 which can be pulled off by the user of the storage device from the adhesion layer 14 in the direction of the arrow. The storage device 2 can then be secured to a screen with the adhesion layer 14 which is exposed after the removal of the protective film 15.

The adhesion layer 14 is followed by a diaphragm layer 16 which is provided with through cut-outs 8 in the same way as the adhesion layer 14. The diaphragm layer 16 is manufactured of light-impermeable material so that light can only pass through the diaphragm layer 16 in the region of the cut-out 8. When the diaphragm layer 16 or the cut-outs 8 are made adequately thick then a focusing effect operating in accordance with the aperture diaphragm principle can be achieved. For this the thickness of the diaphragm layer 16 or of the cut-outs 8 must be selected in dependence on the sensitivity of the photosensitive material and on the thickness of the glass tube of the screen.

Thus a largely sharp image of picture displayed on a screen can be achieved on the photosensitive layer 17 which is connected to the diaphragm layer 16 at its side remote from the adhesion layer 14.

The photosensitive layer 10 is followed at the side remote from the diaphragm layer 16 by a suitable reflective layer 18 for the reflection of the light radiated by the monitor. This reflective layer can in particular be of a metallic design and reflects the light radiated by the monitor and passing through the photosensitive material 16 back onto the photosensitive material 17.

All layers are preferably manufactured from flexible material, which in particular facilitates the release or removal of the storage device from a screen.

Figure 4:
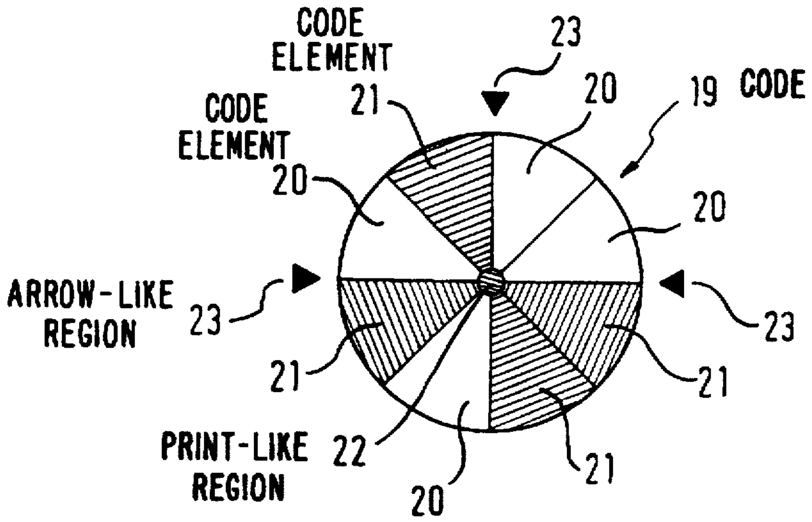
FIG. 4 is an illustration of a code transmitted with the method of the invention.

FIG. 4 shows a code 19 which can be transmitted with the method of the invention and which is suitable for the exposure of the storage device 2 in accordance with FIGS. 2 and 3.

The code 19 is built up in a point-symmetrical manner relative to its center point and has a substantially circular shape.

The code 19 is split up into eight adjoining code elements 20, 21 which each have the form of a sector of a circle.

In the example shown in FIG. 4 specific code elements 20 are shown light whereas the remaining code elements are shown dark. Through different arrangements of the light and dark regions and also through a variation of the ratio between the numbers of the light and dark regions a total of 256 different codes can be transmitted or represented when using eight code elements 20, 21 in the shape of a sector of a circle.

The storage device 2 is respectively attached over the code 19 shown on the screen 1 so that in each case one cut-out 8, 9 is located over each code element 20, 21 by which the information (light or dark) contained in the code element 20, 21 is transmitted onto the photosensitive material 17 of the storage device 2.

Since the code elements 20, 21 have the shape of a sector of a circle a correct exposure of the storage devices 2 is always ensured when the cut-outs 8, 9 are located over the respectively associated circular sector-like region of the code 19. A variable arrangement of the cut-outs 8, 9 in the full region of a code element 20, 21 having the shape of a sector of a circle is thus possible, at least when the areal extent of the cut-outs 8, 9 is substantially smaller than the areal extent of the code elements 20, 21. In this manner it is ensured that for the storage of codes 19 represented in different sizes on television screens 1, and which then likewise have accordingly varying sizes, a unitary and constant size can be stored in a storage device 2. Thus unitary storage devices 2 can be used within a certain range for different screen sizes. If this range is exceeded then the storage device 2 can be split up, as explained for example in connection with FIG. 2, into two differently sized regions 6, 7.

A point-like region 22 is transmitted at the center point of the code 19 over which the central cut-out 13 of FIG. 2 can, for example, be positioned and which can change its color during the exposure time. A color change can thereby, for example, take place after the exposure time has fully expired.

At least at the start of the transmission of the code 19 arrow-like regions 23 can be distributed over its periphery, for example at three positions. These arrow-like regions 23 serve for the positioning of the storage device on the screen 1. The notch-like reference markings 11, 12 in accordance with FIG. 2 are in particular to be aligned with the arrow-like regions 23.

The method of the invention is not restricted to the embodiment shown in FIG. 4 for the transmission of a code 19. More or fewer code elements can also be easily contained in one code, or a plurality of brightness stages or colors can be transmitted per code element. In particular, when transmitting a code with three different brightness steps "bright", "medium" and "dark" at least one specific code element of the step "medium" can be transmitted in that it is transmitted over approximately half the total exposure time as a "bright" step and over the rest of the exposure time as a "dark" step. In this manner the security against forgery can be increased, because the television viewer, on considering the code which is shown once, cannot judge which code element ultimately calls up the value "medium" on the storage device.

I claim:

1. Device for storing a picture information code displayed on a part of an area of a monitor including a monitor surface and a monitor side, the device comprising a storage medium of photosensitive material which can be secured on the monitor surface by means of an adhesion layer effective at the monitor side, wherein the photosensitive material is applied onto an areal carrier medium and is there active at the monitor side only in specific active regions spaced apart from one another.

2. Device in accordance with claim 1, wherein a mask or diaphragm layer is provided at a side of the carrier medium adjacent the monitor and is made permeable to light in the active regions but impermeable to light in regions lying between the active regions.

3. Device in accordance with claim 1, wherein the photosensitive material is only applied to the active regions of the carrier medium.

4. Device in accordance with claim 2, wherein the mask or diaphragm layer comprises a light-impermeable material having at least one cut-out, with the cut-out forming the light-permeable region.

5. Device in accordance with claim 4, wherein a plurality of cut-outs are provided, including between 3 and 500 substantially circular cut-outs forming individual aperture diaphragms.

6. Device in accordance with claim 4, wherein the cut-outs, or the active regions, are distributed substantially regularly about a center point of the mask layer or diaphragm layer.

7. Device in accordance with claim 2, wherein the thickness of the diaphragm layer is selected in dependence on the sensitivity of the photosensitive material, on the size of the cut-outs provided in the diaphragm layer and/or the sharpness of a picture which is shown on a surface of a screen and to be stored.

8. Device in accordance with claim 2, wherein the mask or diaphragm layer comprises one of paper, card, cardboard and plastic and is laminated with the photosensitive material or with its carrier medium.

9. Device in accordance with claim 2, wherein at least one reference mark distributed around a periphery of the carrier medium, or of the mask or diaphragm layer, is or are provided and serves or serve for positioning on the monitor.

10. Device in accordance with claim 1, wherein an outer contour line of the carrier medium and/or of the mask or diaphragm layer describes a non-point-symmetrical line.

11. Device in accordance with claim 9, wherein the reference marking is formed by at least one part of an outer contour line of the carrier medium and/or of the mask or diaphragm layer.

12. Device in accordance with claim 2, wherein a laminate comprising the mask or diaphragm layer and the photosensitive material or carrier medium is formed from one inner substantially circular region and at least one ring region concentrically surrounding the circular region, with the circular region and the ring region being separable from one another.

13. Device in accordance with claim 12, wherein a cut-out or effective region in the ring region is associated with each cut-out or each active region in the circular region, with the respectively associated cut-outs or the respectively associated effective regions each being arranged substantially on a straight line extending away from a center point of the mask or diaphragm layer.

14. Device in accordance with claim 12, wherein both the circular region and also the ring region are provided with reference markings distributed around a periphery of the carrier medium or of the mask or diaphragm layer.

15. Device in accordance with claim 2, wherein the mask or diaphragm layer is made substantially circular or polygonal.

16. Device in accordance with claim 2, wherein a further circular centering cut-out is provided at a center point of the mask or diaphragm layer.

17. Device in accordance with claim 2, wherein at least one cut-out providing security against forgery is so positioned in the mask or diaphragm layer that the active region formed by this cut-out providing security in forgery receives light from at least two code elements which can be shown on the monitor.

18. Device in accordance with claim 2, wherein an outer contour of the mask or diaphragm layer corresponds substantially to an outer contour of the carrier medium.

19. Device in accordance with claim 1, wherein the photosensitive material comprises a substance which visibly changes during the action of light.

20. Device in accordance with claim 1, wherein the photosensitive material is designed for storage of code elements of different brightness steps.

21. Device in accordance with claim 1, wherein the photosensitive material is designed for storage of colored picture information, with the photosensitive material containing a plurality of photochromic substances sensitive to light of differing wavelength.

22. Device in accordance with claim 1, wherein the photosensitive material is sensitive both to ultraviolet light and also to visible light, with a stored picture being erasable by irradiation with ultraviolet light.

23. Device in accordance with claim 1, wherein a layer which is a bright layer, a white layer and/or a metallic layer is provided at a side of the carrier medium remote from the monitor side and reflects the light radiated by the monitor back onto the photosensitive material.

24. Device in accordance with claim 23, wherein an aluminum or silver layer is vapor deposited onto the side of the carrier medium of the photosensitive material remote from the monitor side.

25. Device in accordance with claim 2, wherein the adhesion layer is attached to a side of the mask or diaphragm layer remote from the carrier medium.

26. Device in accordance with claim 1, wherein a layer which absorbs visible light is provided at a side adjacent the monitor.

27. Device in accordance with claim 1, wherein at least one lens is arranged between the adhesion layer and the carrier medium.

28. Carrier card for at least one storage device in accordance with claim 1, wherein the carrier card comprises one of paper, card, cardboard, laminated card and cardboard onto which at least one storage device is releasably secured by means of its adhesion layer.

29. Carrier card in accordance with claim 28, wherein handling depressions are provided to simplify removal of the storage devices.

30. Carrier card in accordance with claim 28, wherein the carrier card has the format of a postcard and a weight including the storage medium which is smaller than or equal to 50 g.

31. Method for the technical transmission of a code which is to be represented on a part of an area of a television screen, which comprises a plurality of code elements of different brightness steps, and which can be stored in a storage medium attached to a television screen, comprising the step of transmitting the code in a substantially point-symmetrical form in order to provide a possibility of storing codes shown on television screens of different sizes in storage media of unitary sizes.

32. Method in accordance with claim 31, wherein the code is transmitted in a substantially circular form.

33. Method in accordance with claim 32, wherein the code is transmitted with code elements having substantially the shape of a sector of a circle.

34. Method in accordance with claim 31, wherein at least one marking for positioning the storage media on the television screens is transmitted in addition to the code.

35. Method in accordance with claim 31, wherein specific code elements of a code are transmitted in time sequence within a transmission.

36. Method in accordance with claim 31, wherein when transmitting a code with three different brightness steps "bright", "medium" and "dark" at least specific code elements of the "medium" step are transmitted in that they are transmitted over approximately half the total exposure time as a "bright" step and over the remainder of the exposure time as a "dark" step.

37. Method in accordance with claim 31, wherein at least one marking the color or brightness of which changes after a specific transmission time is transmitted in addition to the code, in order to indicate an end of the exposure time of the storage medium.

38. Method in accordance with claim 31, wherein the code is transmitted by means of teletext which can be optionally blended in during a television transmission.

* * * * *